Patented Jan. 16, 1934

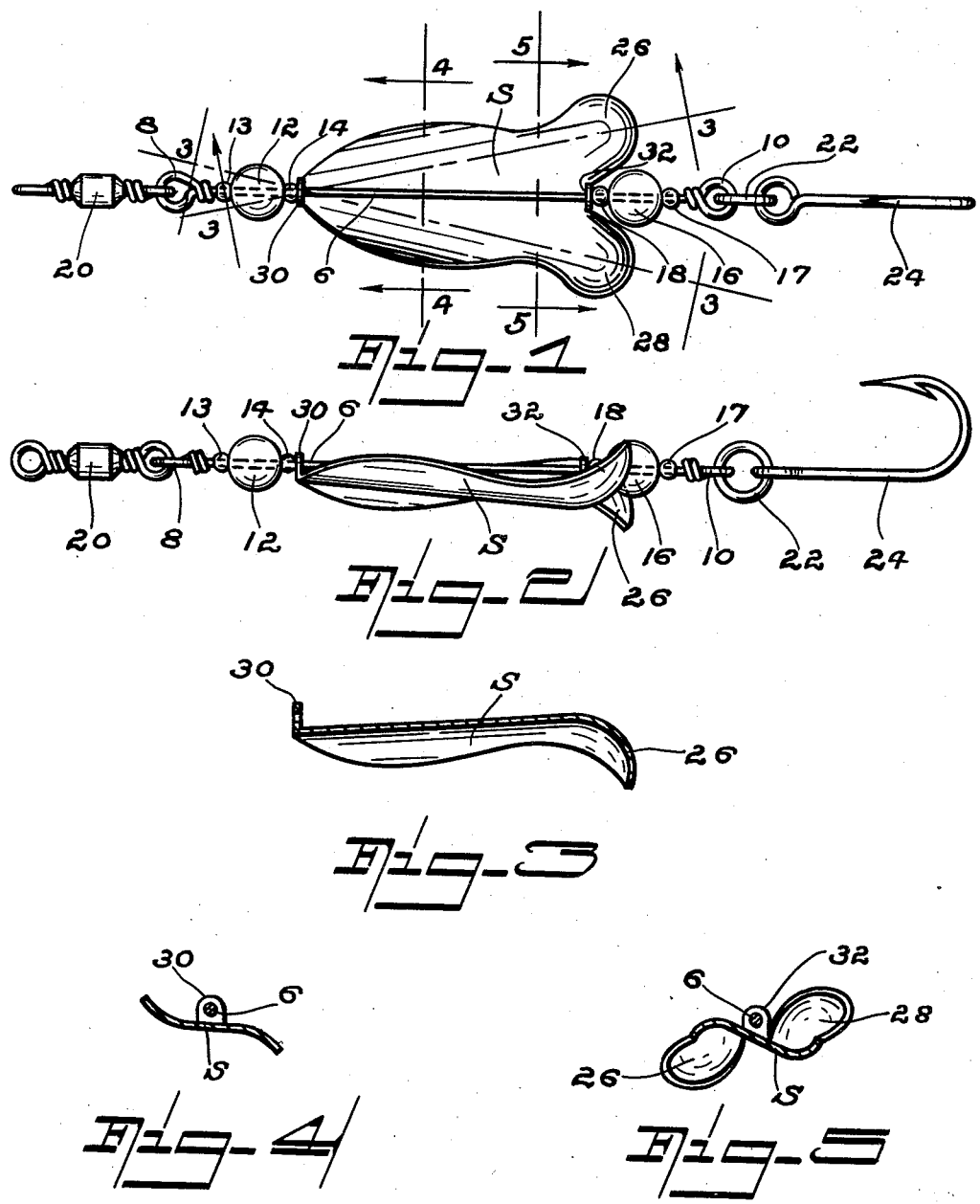

1,943,283

UNITED STATES PATENT OFFICE 1,943,283

TROLLING SPINNER

Bertie D. Beil, Renton, Wash.

Application October 13, 1931. Serial No. 568,604

2 Claims. (Cl. 43—45)

My present invention relates to the art of fishing lures and more particularly to a trolling spinner.

There have been many hundreds of different types of lures created, all alleging specific and new purposes. In the present device I have provided a spinner which will spin at very low trolling, one which will spin freely, even though fresh bait be used in rear of the spoon and further, one which will not create a weight.

The principal object of my invention therefore is to provide a trolling lure which will spin freely through the full range of trolling speed encountered under fishing conditions.

A further object is to provide a trolling spinner which will operate freely even though fresh bait as worms or the like be towed behind the spoon.

A final object is the provision of a structural shape within my spoon, which will prevent the formation of a weight which so often detracts from the utility of a spinner.

Other and more specific objects will be apparent from the following description taken in connection with the accompanying drawing, wherein Figure 1 is a plan view showing my trolling lure.

Figure 2 is a side elevation of the same.

Figure 3 is a sectional view taken longitudinally along the lines 3—3 of Figure 1.

Figure 4 is a cross sectional view taken along the lines 4—4 of Figure 1.

Figure 5 is a cross sectional view taken along the lines 5—5 of Figure 1.

Referring to the drawing, in which like reference characters indicate like parts, 6 designates the spinning axis which I normally provide as a straight stiff piece of wire, which is bent at its front end to form the loop 8, and at its rear end to form the loop 10. Disposed substantially midway between loop 8 and 10, is the spoon itself S. In order to provide for maximum rotation of the spoon, I have provided at the front end a plurality of beads. A large one 12, which usually is of a bright color and two smaller ones 13 and 14, which are intended to space the large bead away from the twisted end of loop 8 and also from the spoon itself. At the rear end of the spoon I have another similar combination of beads. Consisting of the large bead 16 and the smaller beads 17 and 18. The small bead 18 is quite essential, in that it spaces the large color bead 16 away from the spoon sufficiently that the tails of the spoon will not strike it.

Secured within loop 8, I normally provide a conventional type of swivel 20, and at the rear end secured within loop 10 I provide a ring as 22 to which any desirable type of fish hook may be secured. In the drawing I have shown a short shank hook, however, in many instances it is desirable to use a treble hook a this point. In other instances it is desirable to use the so called snelled hook, in which a short piece of leader is interposed between the hook and ring 22.

With the construction I have outlined it has been found that shank 6 will not normally revolve and any twisting that might be imparted to it by the towing lines will be dissipated by the swivel 20. This enables the bait to be towed along without any unnatural revolving action. This life-like presentation of the bait is a very important matter.

In designing spoon S, it has been the endeavor for a long time to produce a spinner which will revolve even though towed at varying speed, and one which must at all times revolve without creating any vacuum behind the spoon. This creates bubbles or a wake as normally termed, and tends to place the bait in a very unfavorable position, destroying the visibility and making it seem unnatural and thus very unattractive to the fish. I have found that if I can create streams of water passing over the spoon, which will not fall backward in the line of travel of the spoon that I can avoid this undesirable wake. To accomplish this purpose, I have formed as can be best noted in Figure 1, my spoon with a straight line groove along the line 3—3. This is further illustrated in Figure 3. Now, each side of the spoon has a similar groove but the tail portion of lips 26 and 28 are of necessity turned in opposite directions and the grooves themselves are inclined in opposite direction as is probably best illustrated in Figure 2.

I secure my spoon S to the axis of revolution 6, by means of the upturned lugs 30 and 32, which are disposed to abut the small beads 14 and 18, respectively. In the showing in Figure 1, I have shown my spoon as being of a general fish shape with a more or less pointed front, a swelled out body portion and the two tail portions 26 and 28. This is a desirable shape as it simulates the appearance of a fish, however, the exact shape of the spoon is relatively unimportant, if the principle of the two grooves oppositely disposed and of equal extent with their axis forming an angle with shank 6 is used.

The foregoing description and the accompanying drawing are believed to clearly disclose a preferred embodiment of my invention but it will be understood that this disclosure is merely illustrative and that such changes in the invention as may be made are fairly within the scope and spirit of the following claims.

I claim:

1. The combination with a non-rotary shank, of a spinner having front and rear perforated bearing lugs on the shank, said spinner having a flat substantially triangular central portion, the plane of which is parallel with the shank, oppositely turned diverging edges forming grooves at the sides of said flat portion, oppositely turned, spaced, tail-portions forming outwardly flaring extensions of the grooves, and said tail portions located in the rear of the rear lug.

2. The combination with a non-rotary shank having looped ends, spacing beads adjacent the looped ends, and a spinner having front and rear bearing lugs on said shank, said spinner having a flat substantially triangular central portion for the spinner between said lugs, the outer edges of said flat portion terminating in diverging lines and oppositely turned lateral edges forming grooves along the diverging lines, and complementary tail portions located at the rear ends of the diverging lines and forming oppositely, outwardly flaring extensions of the grooves at the rear of the rear lug.

BERTIE D. BEIL.